April 12, 1966 R. A. OLNEY 3,246,239
ELECTROSTATIC GENERATOR FOR USE IN DETERMINING THE
ELECTROSTATIC ACCUMULATION PROPERTIES OF FIBROUS
MATERIAL AND THE LIKE
Filed Jan. 16, 1962 2 Sheets-Sheet 1

FIG. I

INVENTOR.
Robert A. Olney
BY Robert H. Robinson

April 12, 1966 R. A. OLNEY 3,246,239
ELECTROSTATIC GENERATOR FOR USE IN DETERMINING THE
ELECTROSTATIC ACCUMULATION PROPERTIES OF FIBROUS
MATERIAL AND THE LIKE
Filed Jan. 16, 1962 2 Sheets-Sheet 2

INVENTOR.
Robert A. Olney
BY Robert H. Robinson

United States Patent Office 3,246,239
Patented Apr. 12, 1966

3,246,239
ELECTROSTATIC GENERATOR FOR USE IN DETERMINING THE ELECTROSTATIC ACCUMULATION PROPERTIES OF FIBROUS MATERIAL AND THE LIKE
Robert A. Olney, Wilmington, Del., assignor to Atlas Chemical Industries, Inc., Wilmington, Del., a corporation of Delaware
Filed Jan. 16, 1962, Ser. No. 166,576
2 Claims. (Cl. 324—72)

This invention relates to a testing device, and in particular, to a device for determining the electrostatic accumulation properties of materials such as textile fibers.

Staple textile fibers are difficult to handle and to subject to quantitative electrostatic measurements. A currently used electrostatic testing method comprises "handling" a quantity of staple fiber with clean neoprene gloves and then depositing the fiber into a Faraday Pail. The pail is connected to a device capable of indicating qualitatively or quantitatively the presence of an electrostatic charge on the fiber. Due to the difficulty in "handling" the fiber reproducibly, this method is not quantitative.

It is an object of this invention to provide a device and a method for easily and reproducibly determining the degree of electrostatic accumulation propensity of staple textile fibers.

Other objects of the invention will be apparent to those skilled in the art from the following detailed description.

The invention comprises a device and a method for testing the electrostatic accumulation properties of materials. The device comprises a first element adapted to contact the material being tested. At least a portion of the first element is electrically conductive and in contact with the material being tested. It is preferred that the conductive portion of the first element be electrically grounded. A rubbing element which is made of a material separated from the material being tested in the triboelectric series is spaced from the first element and is adapted to be brought into rubbing contact with the material being tested. An electrostatic measuring device is adapted to be brought into electrical contact with the material being tested after said material has been in rubbing contact with the rubbing element, and the amount of electrostatic charge accumulated on the test material is determined. The electrostatic measuring device may be brought into electrical contact with material being tested by means of an electrically conductive element spaced from said first element, not in electrical contact with said rubbing element, and adapted to contact the material being tested. In the preferred embodiment of the device of this invention, the electrically conductive element and the rubbing element are so positioned relative to each other that there is an intervening period of no rubbing between the contact of a portion of the material being tested by the rubbing element and the contacting of said portion of material by the electrically conductive element.

Figure 1:
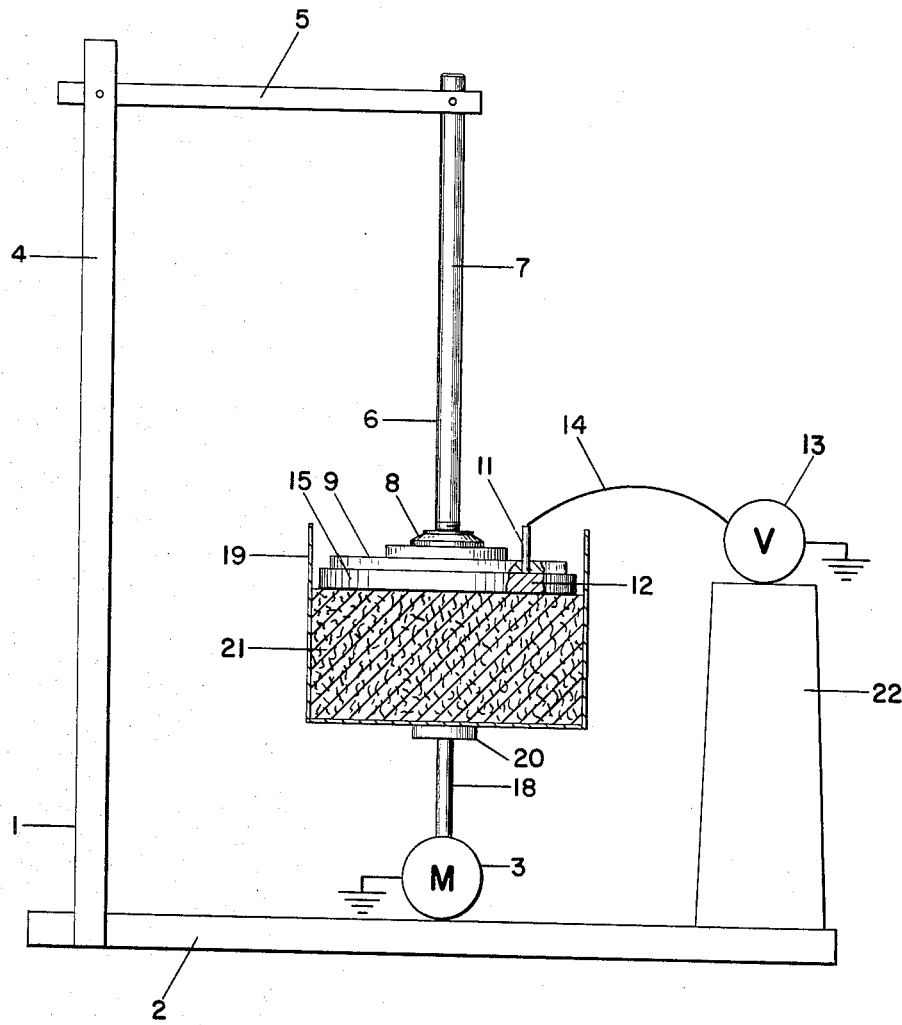
FIGURE 1 is a side elevational view of the device of the invention.

Referring now to the drawings for a detailed description of a device representative of this invention, in FIGURE 1 the reference numeral 1 indicates a stand having a base 2 of sufficient weight to support a motor 3 without undue vibration. The stand 1 has a vertical shaft or standard 4 to which is connected a horizontal shaft or support 5. The support 5 holds the rubbing element-electrically conductive element assembly 6 in such a manner that the assembly 6 can be vertically adjusted, i.e. raised and lowered, but is held stationary during the operation of the device.

Figure 2:
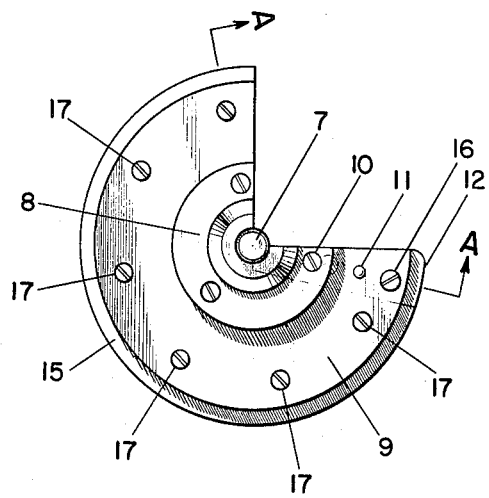
FIGURE 2 is a top view of a rubbing element-electrically conductive element assembly.
Figure 3:
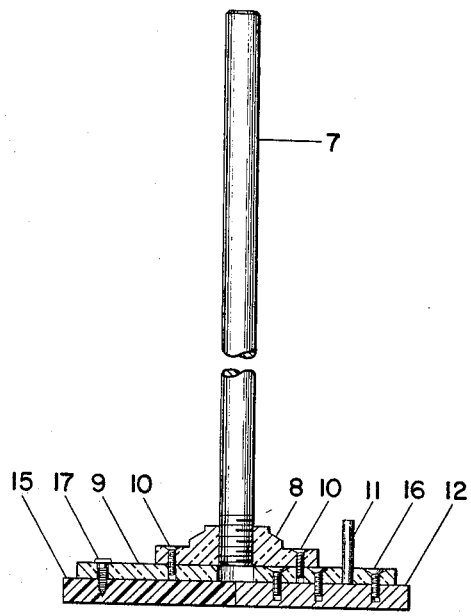
FIGURE 3 is a sectional side view taken along line A—A of FIGURE 2.

Referring to FIGURES 2 and 3 for a detailed description of the rubbing element-electrically conductive element assembly 6, the assembly 6 comprises a shaft 7 which is threaded into a nonconductive support 8. The nonconductive support 8 is attached to an adjoining nonconductive support 9 by means of screws 10 or other suitable attaching means. There is a hole in support 9 through which electrical contact 11 protrudes. The electrical contact 11 is directly attached to an electrically conductive element 12 and is also electrically connected to a grounded electrostatic voltmeter 13 by means of wire 14 (see FIGURE 1). The electrically conductive element 12 is inserted into a gap in a nonconductive rubbing element 15, and the electrically conductive element 12 is held in place by connecting it to supports 8 and 9 by means of screws 10 and 16. The rubbing element 15 is positioned by attaching it to supports 8 and 9 by means of screws 10 and 17.

Referring again to FIGURE 1, the motor 3 has a rotatable metal shaft 18 which is connected to a pail 19 by means of a metallic support 20 which is directly fastened to the pail 19. The staple textile fiber 21 which is to be tested is deposited in pail 19, and both pail 19 and fiber 21 are rotated by motor 3. As the fiber 21 is rotated, the rubbing element 15 is brought into contact with the fiber 21. If an electrostatic charge accumulates on the fiber 21, it can be measured on the voltmeter 13 which may be placed on a stand or support 22.

The measuring device of this invention operates in the following manner: As the rubbing element 15 rubs against the rotating staple textile fiber 21, if it has the propensity, the fiber will generate an electrostatic charge which is then transferred, either totally or in proportional amount to the electrically conductive element 12. The electrostatic charge is then transferred to the electrical contact 11, through the wire 14, and measured on the electrostatic voltmeter 13.

If a nonconductive rubbing element 15 with a gap, i.e. having a section removed as clearly illustrated in FIGURE 2, is used, an electrically conductive element 12 may be inserted so as to form one edge of the gap. The pail 19 and textile fiber 21 may be rotated in a direction such that the fiber passes through the gap before contacting the electrically conductive element 12. As the fiber rubs against the nonconductive rubbing element 15, an electrostatic charge may be generated; as the fiber passes through the gap no further charge is generated, but that already present on the fiber is given a short time to dissipate (through the fiber mass 21 to the pail 19 and thus to ground) before measurement.

The rate at which static electricity will dissipate from a fiber mass is a function mainly of the conductivity of the fiber, assuming that the fiber mass density, surface area and contact with the pail are held substantially constant. The conductivity of the fiber is dependent on its composition and modification such as the chemical treatment. The measuring device of this invention enables one to determine the effectiveness of antistatic chemical treatment.

The rate of increase of the static charge collected by the electrically conductive element obviously depends on the charging rate versus the discharging rate of the fiber mass. Unless the charging rate is greater than the discharge rate, there will be no net charge deposited on the electrically conductive element. In operating the device of this invention, the charge rate of the fiber being tested depends on its composition and also the composition of the rubbing element which is brought into contact with the fiber mass. Generally, the further apart two materials are in the triboelectric series, the greater the charging rate will be. Identical surfaces usually will not generate a static charge. One of the advantages of the device of this invention is that the rubbing element which is brought into contact with the fiber mass can easily be removed and plates of various compositions attached. This enables one to get good electrostatic tests on a wide variety of fibers. It is apparent that the static generating propensity of the staple textile fiber depends on the composition of the fiber and the rubbing element.

Though it is preferred to use a nonconductive rubbing element having a gap, a rubbing element without a gap may also be used. One reason for preferring a rubbing element with a gap is that the gap permits dissipation of the electrostatic charge, provided that the fiber passes through the gap before its electrostatic charge potential is measured, and this more nearly simulates actual conditions. Therefore, unless the fiber mass is especially conductive, in which case there would be no accumulation of electrostatic charge, a charge potential will register on the voltmeter.

As illustrated in the drawings, the nonconductive rubbing element is attached to one electrically conductive element, but more than one electrically conductive element may be attached to the nonconductive rubbing element provided that only one conductive element is connected to the voltmeter. Alternatively, the staple fiber may be rubbed by a nonconductive rubbing element, and then a voltmeter may be electrically contacted to the fiber mass by an external means after the fiber mass is rubbed by the nonconductive rubbing element.

In the preferred embodiment, a nonconductive rubbing element is used to generate an electrostatic charge on the material being tested. It should be noted that an electrically conductive rubbing element may be used, provided that the electrically conductive element which is used to make contact between the material being tested and the electrostatic voltmeter is electrically insulated from the conductive rubbing element.

In accordance with this invention, many variations may be made in the materials and design of the electrostatic testing devices. The rubbing element may be rotated instead of the pail. The pail may vary widely in size and may be made of any suitable material. It is preferred that at least about 10% of the pail area in contact with the fiber mass be an electrical conductor and be grounded in order for the fiber mass to dissipate electrostatic charge. The rubbing element may be made of any suitable material separated from the material to be tested in the triboelectric series, with various types of plastics and synthetic resins being particularly useful. It is preferred to use polytetrafluoroethylene for it is at the bottom of the triboelectric series. If a gapped rubbing element is used, the gap may vary in size, through generally a gap of more than about 270° is not preferred. The electrically conductive element may vary in size and shape and may be made of any electrically conductive material suitable for such construction.

In using the testing device of this invention, the test conditions and procedures may also be varied. The amount of staple fiber to be tested may vary within wide limits, e.g. 5 grams to 100 grams per 100 cubic inches of pail capacity. The staple fiber may or may not be carded. The pressure of the rubbing element, when it is brought into contact with the staple fiber, may be varied. Any type of electrostatic voltmeter may be used. Instead of grounding both the voltmeter and the pail as preferred, the voltmeter may be electrically connected to the rubbing element and the pail, and the potential between the rubbing element and the pail may be measured and used to evaluate the conductivity of the material being tested. Test conditions may be varied, with from 10% to 70% relative humidity and from 50 to 100° F. being generally suitable. The duration of the test and the speed of the rotating element, either the pail or the rubbing element, may be varied.

In addition to being useful for testing the electrostatic accumulation properties of various materials such as textile fibers, the device of this invention may also be used to test the electrostatic generating propensity of various materials, such as plastics and synthetic resins, when rubbed against other materials. In this case, the material to be tested may be fabricated in the form of a plate and used as the rubbing element. It may then be rubbed against various materials to determine whether it will generate an electrostatic charge and the magnitude of such a charge.

The following example illustrates a preferred method of using an electrostatic testing device of this invention.

*Example*

An electrostatic testing device was designed to test the effectiveness of various antistatic agents, which were applied to a wide variety of staple textile fibers. The device which is illustrated by the drawings had a stainless steel pail which had a diameter of about 6 inches and had a capacity of about 100 cubic inches. The pail was grounded through the motor which rotated it. The rubbing element was made of polytetrafluoroethylene and had a 90° gap with one electrically conductive element inserted to form one edge of the gap. The electrically conductive element was made of polished brass.

The tests were conducted at about 40% relative humidity and about 75° F. In each test run, about 40 grams of staple textile fiber that had been sufficiently carded to make it open and uniform was used. The pail containing the fiber was rotated at about 80–90 r.p.m. The plate assembly, which weighed about 500 grams, was allowed to rest on the fiber mass in the rotating pail so as to generate static electricity on the fiber. The pail was rotated in such a manner that the fiber passed through the gap in the nonconductive rubbing element before it contacted the electrically conductive element. The duration of the tests was one minute, and the highest voltage reading occurring in this interval was measured by an electrostatic voltmeter having a range of 400–2000 e.s.v.

Although the device of this invention is designed primarily for testing textile fibers and various dressings applied to textile fibers, it may be employed for testing other materials. It should be noted that both natural and synthetic textile fibers can be tested with this device.

Having completely described this invention, what is claimed is:

1. A device for use in testing the electrostatic accumulation properties of a material comprising
 (a) a support frame,
 (b) a metallic element connected to said support frame which includes means for containing and contacting said material,
 (c) means connected to said metallic element for electrically grounding said element,
 (d) a rubbing assembly supported by said frame and spaced apart from said metallic element, said assembly including a non-conductive element made of a substance separated from said material in the triboelectric series and a metallic charge-collecting element, said non-conductive element and said charge-collecting element having adjacent surfaces aligned in substantially the same plane and having an intervening gap disposed therebetween,
 (e) means connected to said support frame for maintaining said surfaces of said nonconductive element and said charge-collecting element of said rubbing assembly in contact with at least a portion of said material, (f) means for moving said rubbing assembly and said first metallic element relative to each other to produce an electrostatic charge on said material,
(g) and means connected to said charge-collecting element for carrying an electric charge therefrom.

2. A device according to claim 1 which further includes means electrically connected to said charge-carrying means for measuring an electrostatic charge potential.

References Cited by the Examiner
UNITED STATES PATENTS
2,421,430  6/1947  Ott _____ 324—32

FREDERICK M. STRADER, *Primary Examiner.*
WALTER L. CARLSON, *Examiner.*